Dec. 29, 1959 M. M. IGLEHART 2,918,804
CIRCUIT CONTROLLING DEVICE FOR REFRIGERATING APPARATUS
Original Filed July 26, 1954 3 Sheets-Sheet 1
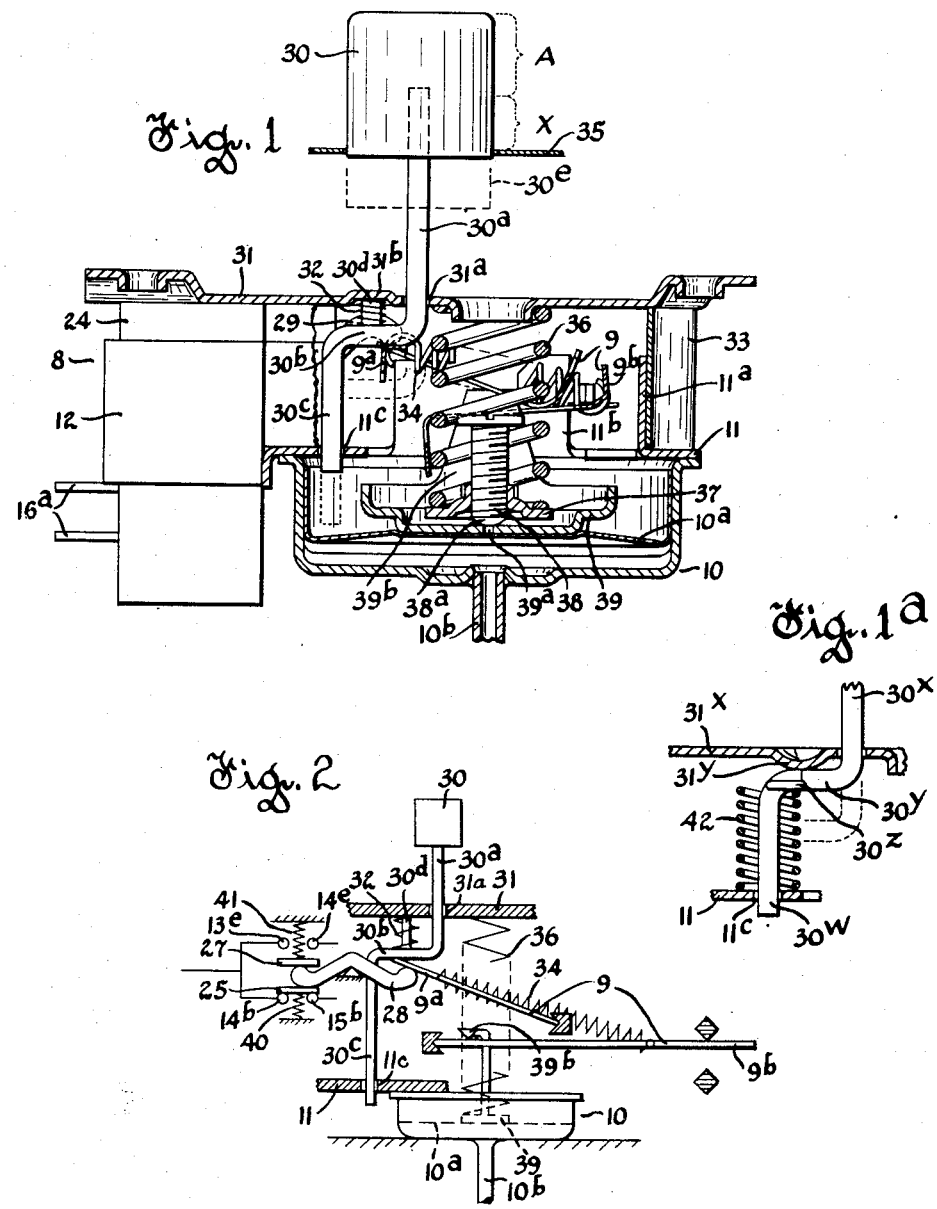
Inventor
Marion M. Iglehart
By
Attorney Dec. 29, 1959 M. M. IGLEHART 2,918,804
CIRCUIT CONTROLLING DEVICE FOR REFRIGERATING APPARATUS
Original Filed July 26, 1954 3 Sheets-Sheet 2
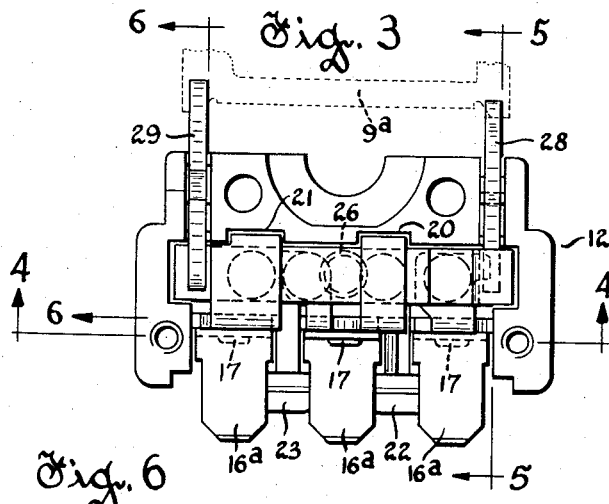
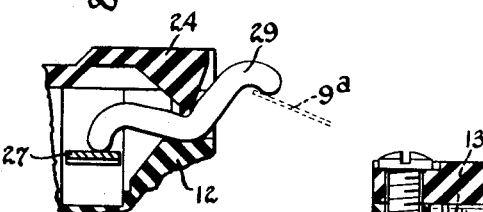
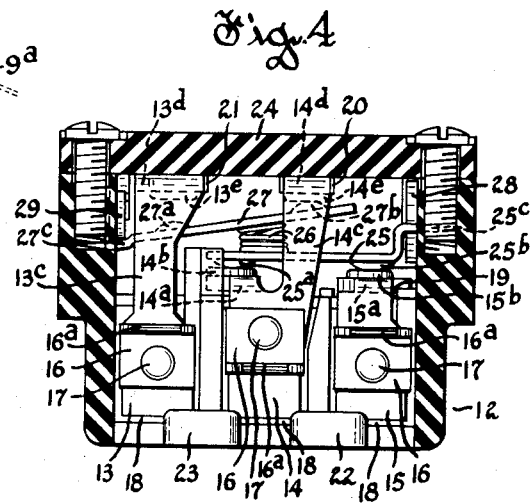
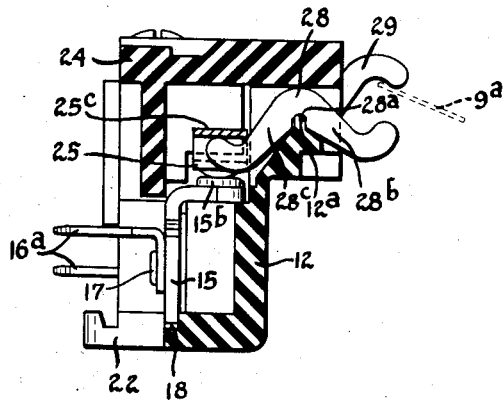
Inventor
Marion M. Iglehart
By U. C. Nelson
Attorney Dec. 29, 1959   M. M. IGLEHART   2,918,804
CIRCUIT CONTROLLING DEVICE FOR REFRIGERATING APPARATUS
Original Filed July 26, 1954   3 Sheets-Sheet 3
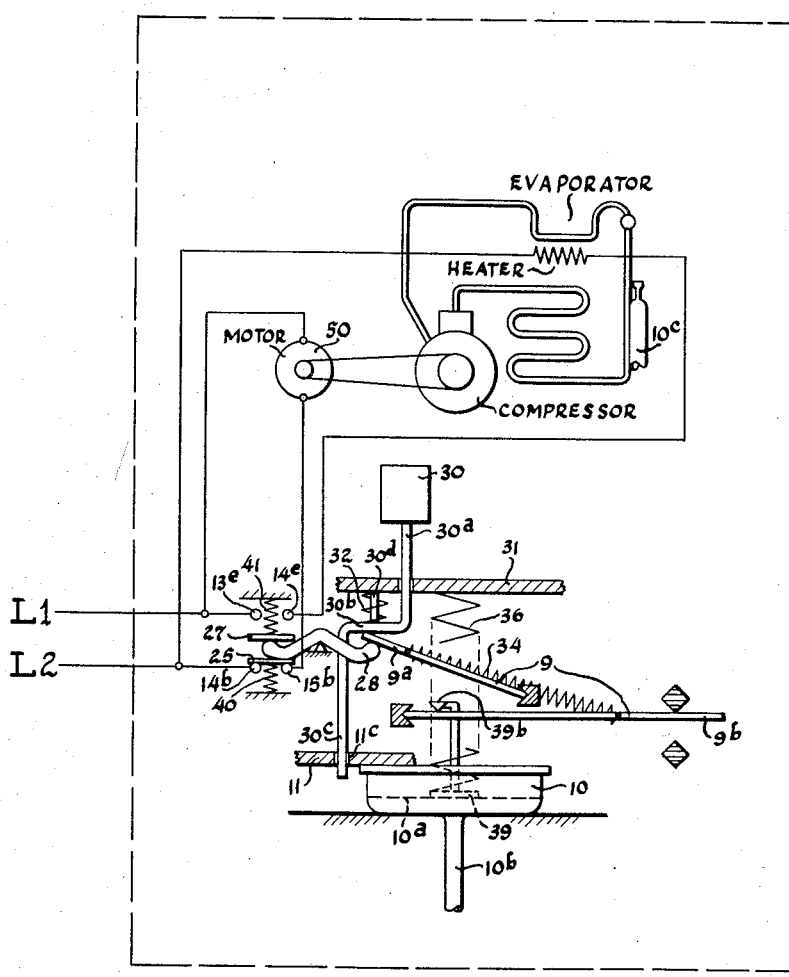
Inventor
Marion M. Iglehart
By W. C. Lyon
Attorney

United States Patent Office 2,918,804
Patented Dec. 29, 1959

2,918,804

CIRCUIT CONTROLLING DEVICE FOR REFRIGERATING APPARATUS

Marion M. Iglehart, Wauwatosa, Wis., assignor to Cutler-Hammer, Inc., Milwaukee, Wis., a corporation of Delaware Continuation of application Serial No. 445,588, July 26, 1954. This application May 20, 1957, Serial No. 662,554

3 Claims. (Cl. 62—156)

This invention relates to improvements in circuit controlling devices, and more particularly to semi-automatic refrigerator control devices, including a pushbutton manually operable to provide a single defrost cycle each time the pushbutton is depressed.

This control device is adapted for use with refrigerators which include an electric heater for effecting defrosting. The temperature sensing capillary tube of the thermostat is preferably clamped to that part of the evaporator which is last to defrost.

A primary object of the invention is to provide a simple and inexpensive, but effective, form of semi-automatic single pushbutton control for defrosting refrigerators, wherein the necessity for use of electric motor operated clocks as automatic timers is eliminated.

Another object is to provide a defrosting thermostatic control device wherein a single depression of the pushbutton will effect disconnection of the compressor motor, and connection of the defrosting heater across the line.

Another object is to provide a control device of the aforementioned character wherein upon attainment by the evaporator of a preselected temperature (due to operation of the heater) the thermostat will act automatically to disconnect the heater and to simultaneously reconnect the compressor driving motor across the line.

Another object is to provide for use in the power element (including the temperature sensing capillary tube) of a fill of a volatile compound at sub-atmospheric pressure, whereby in the event of a leak in the power element the diaphragm of the latter will act automatically to effect disconnection of the heater and simultaneous reconnection of the compressor driving motor.

Another object is to provide an improved form of single-pole, double-throw snap action switch for use with a control device like that herein contemplated, wherein one terminal affords a common connection, a second terminal connects to the compressor motor, and the third terminal connects to the defrosting heater.

Another object is to provide a device of the aforementioned character wherein the pushbutton when depressed remains depressed until the defrosting cycle is completed, and wherein the pushbutton is automatically thrown to its outer extreme position when the thermostat acts to effect reconnection of the compressor driving motor.

Other objects and advantages of the invention will hereinafter appear.

This application is a continuation of my copending application Serial No. 445,588, filed July 26, 1954, now abandoned.

The accompanying drawings illustrate certain preferred embodiments of the invention which will now be described; it being understood that various modifications may be made in the embodiments illustrated without departing from the spirit and scope of the invention as defined by the appended claims.

In the drawings,

Figure 1 is a view, partly in vertical section and partly in side elevation, illustrating a circuit controlling device constructed in accordance with my invention;

Fig. 1a is a fragmentary view, partly in vertical section and partly in elevation, of a device like that shown in Fig. 1; but with a modified form of pushbutton operated actuator for initiating a defrosting cycle; which actuator is spring-biased to effect automatic return of the pushbutton to its outer extreme position upon manual release of said pushbutton;

Fig. 2 is a schematic and diagrammatic illustration of the snap operating mechanism of the switching mechanism with the parts thereof shown in a position to provide for operation of the compressor driving motor; it being understood that two circuit controlling switches are provided; said switches each being normally biased to circuit completing position, but with associated means to insure against simultaneous completion of both circuits;

Fig. 3 is a top plan view of the double switch mechanism positioned within the base portion of the insulating housing, the insulating cover member of the housing being omitted for purposes of illustration; a portion of the snap-acting flipper member being shown in dotted lines in cooperative relationship to the switch actuating insulating elements which are alternately movable in opposite directions thereby;

Fig. 4 is a view, partly in vertical section on the line 4—4 of Fig. 3, looking in the direction of the arrows, and partly in end elevation, with the insulating cover member in assembled position;

Fig. 5 is a vertical sectional view, on the broken line 5—5 of Fig. 3, looking in the direction of the arrows, with the insulating cover in position;

Fig. 6 is a vertical section on the line 6—6 of Fig. 3 looking in the direction of the arrows, with the insulating cover in position; and Fig. 7 is a schematic and diagrammatic illustration, similar to Fig. 2; but additionally showing the two electric circuits, a compressor, an electric motor, an electric heater, and the operative relationship of said parts.

The refrigerator control device illustrated in Figs. 1 to 7, inclusive, includes a double switch unit 8 and a unitary operating assembly therefor, including a snap operating mechanism 9 and a thermostatic device 10 having a pressure responsive diaphragm 10a and a temperature sensing capillary tube, one end portion of which is shown at 10b; the closed end portion 10c (Fig. 7) of tube 10b is shown for convenience in the drawing as being attached to a portion of the conduit connecting the compressor to the evaporator; however, end portion 10c is preferably clamped to that part of the evaporator which is last to defrost after initiation of the defrosting cycle. The thermostatic device 10 is attached to the lower surface of a rectangular base plate 11 (Fig. 1) by means of four screws (not shown) in the manner illustrated in Robbins Patent No. 2,375,387, granted May 8, 1945, to the assignee of this application.

As shown in Figs. 1 and 3 to 6, inclusive, the snap-acting double switch unit 8 comprises a molded insulating base member 12, which is recessed as shown in Figs. 3 to 6, inclusive, to accommodate three combined contact and terminal members 13, 14 and 15. Members 14 and 15 each have an inwardly bent end portion 14a and 15a, respectively, at a preselected lower level, to the upper surfaces of which end portions suitable contact tips 14b and 15b, formed of silver or the like, are attached in any suitable manner, such as by welding. Members 13 and 14 have upwardly extending portions 13c and 14c, the inwardly bent upper ends 13d and 14d of which have contact tips 13e and 14e attached to the lower surfaces thereof as illustrated, and in the manner aforementioned. Members 13, 14 and 15 have like spade terminal lugs 16 attached thereto, as by means of rivets 17; the intermediate lug 16 having its spade terminal portion 16a displaced 180 degrees, as compared with the opposite end spade terminal members 16a, 16a, to provide ample electrical clearance between said parts.

As best illustrated in Figs. 4 and 5, base member 12 is formed with suitable grooves, recesses and abutments, as shown at 18, 19, 20, 21, 22 and 23, to insure proper fixed positioning of members 13, 14 and 15, particularly following assembly of the molded insulating cover member 24 with respect to member 12. Prior to such assembly the other parts of the switch mechanism are assembled as follows: A bridging contactor 25, formed of brass, or other metal of good electrical conductivity, has attached to the lower surface thereof, as by welding, a pair of contact tips 25a and 25b, which respectively overlie the aforementioned contact tips 14b and 15b (Fig. 4). Contactor 25 is provided on the upper surface thereof with an integral offset portion (not shown) of substantially cylindrical form, to provide for centering of the lower end of a relatively short coiled compression spring 26.

Also as shown in Figs. 4 and 5 the right-hand end portion of contactor 25 is bent to extend upwardly at substantially a right angle and then laterally in a plane approximately parallel to the main body portion thereof to provide the portion 25c, for a purpose hereinafter described. A second bridging contactor 27, having a like cylindrical offset portion on the lower surface thereof (not shown) for centering engagement with the upper end of spring 26 (Fig. 4) is provided on its upper surface with a pair of contact tips 27a and 27b for cooperative bridging engagement with the aforementioned contact tips 13e and 14e under given conditions.

Bridging contactor 27 is provided at its left-hand end (Fig. 4) with a portion 27c which is slightly offset downwardly from the main body portion of said contactor, for a purpose hereinafter described.

As illustrated in Fig. 4, both pairs of contact tips 25a, 25b and 27a, 27b would normally be biased into engagement with their cooperating sets of stationary contact tips 14b, 15b and 13e, 14e, respectively. However, means are provided to insure against simultaneous bridging of both sets of stationary contacts 14b, 15b and 13e, 14e. Said means comprises a pair of insulating actuating members 28 and 29, of the forms best illustrated in Figs. 5 and 6; said members preferably being punched from sheets of insulation of the desired thickness. As shown in Fig. 5 the member 28 is provided with an intermediate pivot notch 28a which is adapted to seat upon a ridge portion 12a formed integrally with base 12. Member 28 is provided with a pair of arms 28b and 28c extending downwardly in opposite directions from the point of pivotal support thereof; the respective end portions of said arms being curved upwardly therefrom and rounded, as shown, to provide for assembly thereof with either arm extending outwardly from the point of pivotal support.

Also as shown in Fig. 5, the rounded inner end of arm 28c is adapted to underlie the upwardly offset end portion 25c of bridging contactor 25, and member 28 is biased to the position illustrated when the portion 9a of the snap-actuating mechanism is automatically disengaged from member 28, as an incident to completion of a defrosting cycle, thus permitting contactor 25 to bridge stationary contacts 14b and 15b under the bias of spring 26, as best illustrated in Fig. 4. With the circuit between terminals 14 and 15 thus completed the compressor motor 50 (Fig. 7) of the system will be operated to effect cooling of the area to be refrigerated; it being understood that the preceding operation of the defrosting heater has raised the temperature of the evaporator to a predetermined temperature, say, 50 degrees F.

At the time of initiation of operation of the compressor motor 50, for effecting cooling, the portion 9a of the snap-action mechanism will have been moved automatically to, and will be retained in, the position thereof illustrated in Figs. 5 and 6 (see also Figs. 4 and 7) to insure interruption of the circuit for the defrosting heater. Moreover, it is to be understood that operation of the compressor motor will be continued automatically pending a predetermined degree of downward movement of diaphragm 10a, and the parts controlled thereby; or due to initiation of another defrosting cycle by manually depressing the pushbutton 30 (Figs. 1, 2 and 7).

Said pushbutton 30 is assembled with respect to the cover member 31 of the control device as follows: The straight metal stem portion 30a thereof is inserted upwardly through an opening 31a in the cover member 31, which opening affords sliding and guiding clearance therefor; said stem having an intermediate portion 30b bent at a right angle to portion 30a, and a straight portion 30c bent to extend downwardly, as shown in Figs. 1 and 2, at a right angle to portion 30b. Intermediate portion 30b is provided on its upper surface with a stud or pin 30d, which serves to center the lower end of a coiled compression spring 32 and to limit the degree of upward movement of said pushbutton; the upper end of spring 32 being adapted to seat within an upward depression 31b in the lower surface of cover member 31. The pushbutton 30 is then attached, by a drive fit or by use of a suitable cement, to the upper end of portion 30a.

As shown in Fig. 1, a metal housing member 33 is interposed between cover member 31 and base plate 11; said member 33 being preferably attached by spot-welding thereof to several lugs formed integrally with and bent upwardly from said plate 11; two of said lugs being shown at 11a and 11b in Fig. 1. Cover member 31 is preferably assembled and held in fixed position with respect to housing member 33 and base member 11 in the manner disclosed in the patent of U. F. Carter, No. 2,751,459, granted June 19, 1956, and assigned to the assignee of this application.

With the pushbutton 30 and said stem portions thus assembled with respect to cover member 21, the coiled compression spring 32 is positioned upon stud 30d, and the upper end of said spring is positioned within depression 31b. Base plate 11 (Fig. 1) is provided with an opening 11c, which is adapted to provide a sliding and guiding fit for the lower end portion 30c of the stem of pushbutton 30. As will be noted, the intermediate portion 30b of said stem overlies the left-hand end 9a of the upper or flipper lever of the snap action mechanism 9. Thus upon manual depression of bushbutton 30 the part 9a will be forced over-the-center with respect to the lower lever 9b, and the tension springs, one of which is shown at 34, will effect movement of part 9a with a snap action out of engagement with the insulating actuating member 29 (Fig. 5) and into engagement with the insulating actuating member 28, thus interrupting the energizing circuit of the compressor motor and simultaneously completing the energizing circuit for the defrosting heater of the refrigerating system.

As illustrated in Figs. 1 and 2, the compression spring 32 associated with the stem of pushbutton 30 causes the latter to assume a position corresponding with the position of the flipper lever 9a. Inasmuch as pushbutton 30 when depressed will remain in its depressed position, due to the action of spring 32, such position of the button may be utilized to indicate that the defrosting cycle is in progress, as shown by the dotted line position of the lower end of pushbutton 30 at 30e in Fig. 1. After the aforementioned desired defrosting temperature has been attained the diaphragm 10a will act automatically to effect return of pushbutton 30 to its upper extreme position, by shifting the relative positions of levers 9a and 9b. To afford a more definite visual indication of the condition of the refrigeration system the pushbutton 30 may be provided with an upper end portion of a distinctive color, such as red, as indicated in dotted lines at A in Fig. 1, and a lower end portion of another color, such as green, as indicated in dotted lines at X. Thus, when pushbutton 30 is depressed to initiate a defrosting cycle only the red portion thereof would be exposed above the top wall of the enclosing casing, as represented fragmentarily at 35; whereas during operation of the compressor motor both colored portions of pushbutton 30 would be exposed.

As shown in Figs. 1, 3, 4 and 5 the portions 16a of terminal members 16 are preferably of the so-called "spade terminal" type for cooperation with a female plug member of known form.

Referring again to Fig. 1, the same discloses use of a loading spring 36 which is adapted for factory adjustment of the degree of force to be applied thereby against the diaphragm 10a of the pressure responsive device, or thermostat 10. Such adjustment is adapted to insure completion of the circuit of the compressor motor at a predetermined relatively high temperature (such as the 50 degrees F. aforementioned) at a selected point in the refrigerated area. Such adjusting means is substantially like that disclosed in the aforementioned Carter Patent No. 2,751,459, granted June 19, 1956, and comprises essentially a fixed abutment for the upper end of spring 36; namely, the lower surface of cover plate 31. The lower end of spring 36 is adapted to seat against a nut 37, which is threadedly engaged by a kerfed-head screw 38, which has a reduced or dome-shaped lower end portion 38a fitting into a relatively small opening 39a located centrally of the bottom wall of a combined cup and yoke member 39 to assist in centering the latter. Nut 37 is provided with oppositely extending arms for cooperation with the walls of slots formed in the opposed upwardly extending arms of member 39; one of which arms is shown at 39b in Fig. 1, and diagrammatically in Figs. 2 and 7. By this means the snap action mechanism 9 is operated automatically to effect completion of the compressor motor circuit after completion of each manually initiated defrosting cycle, as aforedescribed.

The schematic and diagrammatic illustrations of the device in Figs. 2 and 7 is functionally quite similar to the showing thereof in Figs. 1, 4 and 5; except that, for simplicity, a single insulating actuating member (like that shown at 28 in Fig. 5) is shown.

For this reason the bridging contactor 25 is shown as normally biased out of engagement with contacts 14b and 15b by a coiled compression spring 40 of relatively low power; but with the various parts in the relative positions thereof illustrated the contactor 25 is biased into bridging engagement with contacts 14b and 15b by the relatively more powerful coiled compression spring 41, which under the aforementioned conditions likewise acts to effect disengagement of contactor 27 from contacts 13e and 14e. After a slight degree of downward movement of pushbutton 30 the left-hand end of flipper lever 9a and the left-hand end of the coiled tension spring (or springs) 34 will carry lever 9a over-center, with a resultant snap action of actuating member 28 in a clockwise direction, to effect disengagement of contactor 25 from contacts 14b and 15b, thus interrupting the circuit of the compressor motor; and to substantially simultaneously effect engagement of contactor 27 with contacts 13e and 14e, against the action of the aforementioned spring 41, to complete the heater circuit for defrosting.

Under the action of spring 32 the pushbutton 30 will be automatically restrained in its depressed position pending completion of the preselected degree of defrosting; and thereafter, due to a predetermined degree of upward movement of member 39, as indicated at 39b in Figs. 2 and 7, the lower lever 9b will be carried upwardly from its lower limit stop until the right-hand end of each spring 34 passes above the pivotal center of lever 9a, to effect upward movement of the parts with a snap action to the respective positions thereof shown in said Figs. 2 and 7.

As aforementioned, the feature of using in the power element, or thermostat, 10 a fill of a volatile fluid at sub-atmospheric pressure affords assurance that in the event of a leak occurring in said power element the diaphragm 10a thereof will automatically assume a position insuring interruption of the defrosting heater circuit and completion of the circuit for the compressor driving motor.

With no internal fill and its interior subjected to atmospheric pressure the flexible diaphragm 10a of the power element assumes a "normal" upwardly biased position. When filled with a compound providing sub-atmospheric pressures within the diaphragm chamber in the range of operating temperatures contemplated, diaphragm 10a will be moved downwardly therefrom in accordance with the difference in forces acting on opposite surfaces thereof. The outer surface would be subjected to atmospheric pressure and the force developed by the spring 36, while the inner surface would be subjected to the pressure generated by the aforementioned fill which varies with change in temperature. Assuming virtually no change in force exerted by spring 36 and exterior atmospheric pressure, any change in forces acting upon diaphragm 10a will be due to change in internal pressure developed in the diaphragm chamber. Even though the latter change is entirely within the sub-atmospheric range, there will be a corresponding change in positioning of diaphragm 10a with respect to the aforementioned normal position thereof.

In the modification illustrated in Fig. 1a various parts of the control device may be exactly like those aforedescribed, with the following exceptions: The stem portion 30x of the single pushbutton may be exactly like the corresponding portion 30a aforedescribed. However, in Fig. 1a the pin 30d and spring 32 associated with stem portion 30b in Figs. 1 and 2 are omitted, and the cover member 31x in Fig. 1a is provided with a downwardly offset portion 31y, the lower surface of which serves as a limiting abutment for upward movement of the intermediate portion 30y of the pushbutton stem. Said intermediate portion 30y is also provided at the left-hand portion thereof with a pair of ears or projections pressed or pinched outwardly from opposite side edges thereof; one of said projections being shown at 30z. Said ears 30z serve as abutments for the upper end of a coiled compression spring 42; the lower end of spring 42 being adapted to seat against the upper surface of base plate 11, through the opening 11c in which the lower end 30w of the pushbutton stem may slide, to assist in guiding the same. As will be understood, the spring 42 acts to return the pushbutton and its stem portions to their upper extreme positions upon manual release of the pushbutton (like 30 shown in Figs 1 and 2). This form of the device lacks the indicating characteristics aforedescribed, but may be otherwise functionally identical therewith.

I claim:

1. A semi-automatic, fail-safe, defrosting control device for electric refrigerators and the like, comprising a two-position, snap-acting switch, a pair of electric circuits alternatively controlled thereby, a thermally responsive power element comprising a shallow cup portion and movable diaphragm spaced apart from and overlying the bottom wall of said cup portion, said diaphragm having its center portion normally self-biased toward the open end of said cup portion and into operative association with a portion of said switch, said power element, including said diaphragm, having a fill of a thermally expansible fluid at sub-atmospheric pressure, manual means operable when said power element is subjected to a temperature below a predetermined temperature to positively operate said switch from one circuit completing position to the other circuit completing position free from operative interference by said diaphragm to effect defrosting, said diaphragm upon subsequent subjection of said power element to a predetermined higher temperature positively operating said switch from said other circuit completing position to said one circuit completing position, and in the event of establishment of atmospheric pressure within said power element resulting from leakage therefrom, the self-biased center portion of said diaphragm acting automatically to effect the last mentioned operation of said switch regardless of the temperature to which it may be subjected.

2. The combination with a refrigerator having an electric motor driven compressor, an evaporator in which refrigerant is circulated, an electric heater energizable for defrosting said evaporator and a source of electric power supply for said heater, of control means including a semi-automatic defrosting control device comprising a two-position snap-acting switch in circuit with said source of electric power, and selectively in circuit with said heater or the electric driving motor, a thermally responsive power element subjected to the temperature of said evaporator and having a movable diaphragm the center portion of which is normally self-biased into operative association with said switch, manual means operable whenever the temperature of said evaporator is below a predetermined value to effect operation of said switch to complete an energizing circuit for said heater and to interrupt the energizing circuit for said driving motor, free from operative interference by said diaphragm, said diaphragm upon said evaporator subsequently attaining a temperature above said predetermined temperature positively operating said switch to interrupt the energizing circuit for said heater and to complete the energizing circuit for said driving motor, and said power element having a fill of a compound providing a sub-atmospheric pressure therewithin, whereby, in the event of establishment of atmospheric pressure therewithin, resulting from leakage, said center portion of said diaphragm will due to its self-biasing action move outwardly against said switch to effect the last mentioned operation of the latter and thereafter maintain said last mentioned operation thereof pending substitution of a completely operative thermally responsive power element.

3. In a unitary, semi-automatic, refrigerator control device, in combination with a compressor adapted when operated to effect circulation of a refrigerating medium, an electric motor adapted when energized to drive said compressor, means through which said refrigerating medium may be circulated, an electrically operated defrosting heater associated with said last mentioned means, a common source of supply of electric current for said motor and said defrosting heater, means for insuring against simultaneous operation of said motor and said defrosting heater, said last mentioned means comprising a circuit for said motor and a circuit for said defrosting heater, a two-position switch for insuring closure of said circuits alternately, means comprising a push-button operable at will to initiate a defrosting cycle regardless of the refrigerating temperature, associated means thereafter operable automatically in response to a given temperature of the refrigerator to initiate operation of said compressor driving motor, said last mentioned means comprising an expansible type power element normally containing a quantity of thermally expansible fluid at sub-atmospheric pressure to render said power element responsive to the temperature within the refrigerator, and said power element having a movable diaphragm portion normally self-biased into operative engagement with switching means for automatically interrupting the defrosting heater circuit and completing the compressor motor circuit in the event of leakage of said fluid from said power element.

References Cited in the file of this patent

UNITED STATES PATENTS

| | | |
|---|---|---|
| 1,109,996 | Kuhlmann | Sept. 8, 1914 |
| 2,001,323 | Dick | May 14, 1935 |
| 2,095,014 | Stark | Oct. 5, 1937 |
| 2,129,499 | Landon | Sept. 6, 1938 |
| 2,375,387 | Robbins | May 8, 1945 |
| 2,647,190 | Lieberman | July 28, 1953 |
| 2,671,838 | Senn | Mar. 9, 1954 |
| 2,714,293 | Duncan | Aug. 2, 1955 |
| 2,751,459 | Carter | June 19, 1956 |